United States Patent
Kim

[11] Patent Number: 6,138,714
[45] Date of Patent: Oct. 31, 2000

[54] ADAPTER FOR A DOME-SHAPED HIGH PRESSURE BUTANE GAS CONTAINER

[76] Inventor: Dong-sook Kim, 361-119 Yongdu-dong Tukyang-gu, Koyang-shi, Kyunggi-do 411-110, Rep. of Korea

[21] Appl. No.: 09/329,356

[22] Filed: Jun. 10, 1999

[30] Foreign Application Priority Data

Apr. 23, 1999 [KR] Rep. of Korea ......................... 99-4578

[51] Int. Cl.$^7$ .................................................. F16K 11/12
[52] U.S. Cl. ...................... 137/614.05; 137/322; 222/509
[58] Field of Search ............................... 137/322, 614.05; 222/402.13, 402.14, 507, 509

[56] References Cited

U.S. PATENT DOCUMENTS

| | | | |
|---|---|---|---|
| 4,082,993 | 4/1978 | Oakes | 137/322 |
| 4,159,102 | 6/1979 | Fallon et al. | 137/322 |
| 4,960,261 | 10/1990 | Scott et al. | 251/148 |
| 5,070,858 | 12/1991 | Wang . | |
| 5,094,365 | 3/1992 | Dorfman . | |
| 5,127,436 | 7/1992 | Campion et al. . | |

Primary Examiner—John Fox
Attorney, Agent, or Firm—Reed Smith Hazel & Thomas LLP

[57] ABSTRACT

An adapter is provided for connecting a dome-shaped high pressure butane gas container and a portable gas stove, the adapter comprising: a connecting body having a first opening, a gas delivery passage extending from the opening, a gas volume controller, and a nozzle body; a pressing member inserted in the first opening, and having a gas flow hole and a groove for leading gas discharged through the gas outlet into the gas flow hole; a supporting plate rotatably arranged at the lower surface of the connecting body, and having a handle, a plurality of elastic sections having stoppers and claws formed integrally from the elastic sections, and two arc-shaped holes; and a cam arranged inside the elastic sections and fixed to the connecting body by bolts, the cam having a third opening for holding the gas outlet of the high pressure butane gas container, a plurality of protrusions, and two holes for inserting the bolts.

In order to connect or separate the adapter to or from the gas container, the adapter or the gas container itself is not rotated, but the supporting plate alone is rotated within a prescribed angle, so that the adapter can be easily connected or separated to or from the gas container without leakage of gas.

1 Claim, 5 Drawing Sheets

ADAPTER FOR A DOME-SHAPED HIGH PRESSURE BUTANE GAS CONTAINER

BACKGROUND OF THE INVENTION

1. Field of the Invention

This invention relates to an adapter for a dome-shaped high pressure butane gas container, and more particularly to, a high pressure butane gas container connecting adapter which may prevent gas leakage so as to prevent accident and is convenient to handle.

2. Description of the Prior Art

In general, conventional gas containers are classified into a butane gas container and a dome-shaped high pressure butane gas container. The butane gas container is commonly used in ordinary weather for indoors and outdoors, and the high pressure butane gas container is used in an extraordinary weather. Since they have shape and structure distinguished from each other, portable gas stoves utilizing the gas containers also differ in shape and structure from each other.

However, in recent years, the portable gas stove for utilizing both the butane gas container and the high pressure butane gas container are widely used.

The butane gas container has a long cylindrical shape, but the high pressure butane gas container has a dome shape and is shorter in length than the butane gas container.

A remarkable difference between the butane gas container and the high pressure butane gas container is shape and structure of a nozzle for providing gas to the portable gas stove, and they also has a difference in a method for connecting to the portable gas stove.

That is to say, the nozzle of the general butane gas container has a gas outlet of small pipe shape. The small pipe-shaped gas outlet is pressed toward the inside of the butane gas container so that a path of the gas is opened to provide the gas to the portable gas stove connected to the nozzle of the butane gas container. However, the nozzle of the dome-shaped high pressure gas container has an external screw on the gas outlet of large diameter to be screwed with the portable gas stove and a nozzle hole formed through the external screw.

There is a disadvantage that because the butane gas container is different from the high pressure butane gas container, they have to be used in the proper portable gas stove alone. Since the gas containers are different in use according to the kind of the portable gas stove, an user must prepare both the butane gas container and the high pressure butane gas container.

Therefore, in order to solve the disadvantage, an adapter for connecting the gas container and the portable gas stove is required to use any portable gas stove regardless of kinds of the gas containers.

One attempt has been made in the prior art to solve the disadvantage and widely used. The butane gas container having the nozzle of small and long pipe shape is connected with a nozzle body formed at a front end portion of the adapter to be used in any kinds of portable gas stove. In order for the adapter to be detachably mounted at the butane gas container and to firmly mounted, attaching means is required.

For the attaching means, it is widely known that a lever which slides orthogonally to a center from a lower end portion of the adapter is worked to be caught at a front end portion of the butane gas container.

However, the attaching means of the above structure frequently gets out of order.

The attaching means has another disadvantage that, if the attaching means is repeatedly used, the caught portion of the slide lever looses so that the gas is leaked out.

The attaching means has a further disadvantage that a person which is lack knowledge in this art cannot easily handle the attaching means.

Therefore, an adapter for a butane gas container which is easily handled by anyone and can be firmly connected to the butane gas container is disclosed in Korean patent no. 129629 to the same inventor of the present invention.

The adapter comprises: a connecting body having a connecting hole to be connected with a gas outlet of the butane gas container, a nozzle for spouting gas flown into the adapter through the opening, and a gas volume controller for controlling the volume of the gas; and connecting means detachably mounted to the butane gas container, wherein the connecting means includes a protrusion to be inserted in a groove of the butane gas container, a supporting plate having a plurality of elastic sections protruded downwardly from the supporting plate, each of the elastic sections having a claw to be caught in a support ring of the butane gas container and a stopper for restricting the rotation of the connecting body, a cam arranged inside the elastic sections and fixed to the connecting body.

By the rotation of the connecting body, the elastic sections spread outwardly, ascending up the cam. The claws of the spread elastic section are caught in the support ring so as for the adapter to be connected to the butane gas container.

The adapter disclosed in the Korean patent no. 129,629 has firm binding force, is easily handled, and prevents the malfunction.

As shown in FIG. 1, the connecting body 1 of the previously described adapter has a protrusions 17 at a bottom surface thereof in which an internal screw is formed, and a nozzle body 14 formed integrally at an upper surface thereof and having an external screw to be coupled with the portable gas stove. The internal screw of the protrusions 17 is coupled with the external screw of a gas outlet 51 of the high pressure butane gas container 5.

In order to connect the adapter to the high pressure butane gas container or to separate the adapter from the butane gas container, the adapter has to be rotated several times. Therefore, it is very inconvenient, and gas may be leaked out if the nozzle body 14 of the connecting body 1 and the gas outlet 51 of the high pressure butane gas container 5 are not firmly screwed.

SUMMARY OF THE INVENTION

In view of the foregoing, it is accordingly, an object of the present invention to provide a new and improved adapter for a high pressure butane gas container, which has all the advantages of the prior art butane gas container adapter and none of the disadvantages.

It is also an object of the present invention to provide a new and improved adapter for a high pressure butane gas container, which is very convenient in use.

It is a further object of the present invention to provide a new and improved adapter for a high pressure butane gas container, which has strong binding force so as to prevent leakage of gas.

The foregoing object is accomplished in one embodiment by providing an adapter for a high pressure butane gas container, the adapter comprising: a connecting body of cylindrical shape having a first opening formed at a lower surface thereof, a gas delivery passage extending from the opening, a gas volume controller arranged at a center portion of the gas delivery passage, and a nozzle body formed at a top portion of the gas delivery passage and on an upper surface of the connecting body; a pressing member for pressing the nozzle arranged on the gas outlet of the high pressure butane gas container, the pressing member having a gas flow hole formed through the pressing member, a groove for leading gas discharged through the gas outlet of the high pressure butane gas container into the gas flow hole, a protrusion protruded from a center portion of the pressing member, and a first O-shaped ring to be sealably disposed between the protrusion of the pressing member and the first opening of the connecting body; a supporting plate rotatably arranged at the lower surface of the connecting body, the supporting plate having a handle protruded from one portion thereof, a plurality of elastic sections protruded downwardly from the supporting plate, each of the elastic sections having a stopper protruded from either side thereof and a claw to be caught in the rim of the high pressure butane gas container, a second opening formed at a center of the supporting plate for inserting the portion that the first O-shaped ring is arranged between the pressing member and the connecting body, and two arc-shaped holes formed near the second opening of the supporting plate; and a cam arranged inside the elastic sections and fixed to the connecting body by bolts, the cam having a third opening for holding the gas outlet of the high pressure butane gas container, a second O-shaped ring for firmly sealing a space between the cam and the gas outlet of the high pressure butane gas container, a plurality of protrusions protruded from an outer circumference of the cam, and two holes for inserting the bolts.

The foregoing and other objects and features of the present invention will become more fully apparent to persons of ordinary skill in the art from the following description and appended claims, taken in conjunction with the accompanying drawings.

BRIEF DESCRIPTION OF THE DRAWINGS

Understanding that these drawings depict only typical embodiments of the invention and are, therefore, not to be considered limiting of its scope, the invention will be described with additional specificity and detail through use of the accompanying drawings in which.

DETAILED DESCRIPTION OF THE PREFERRED EMBODIMENTS

Figure 1:
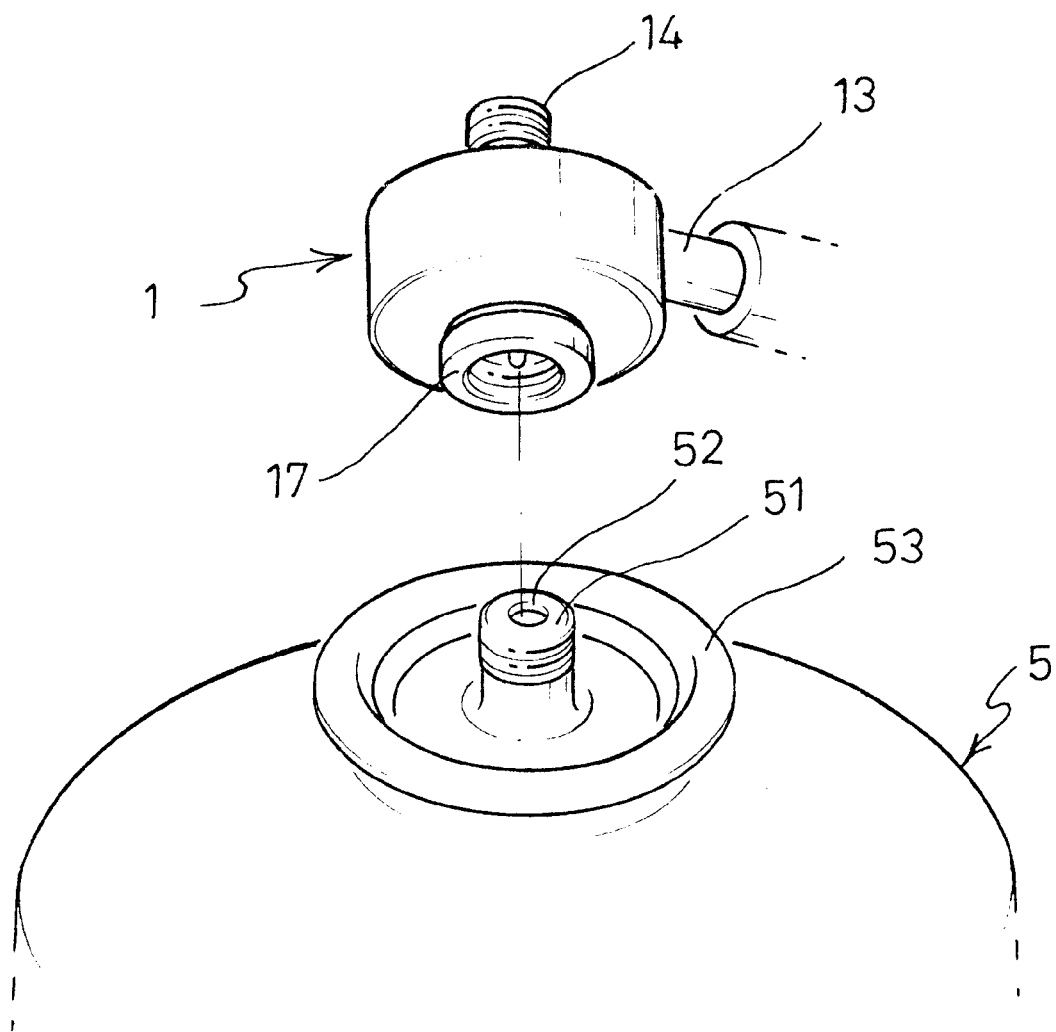
FIG. 1 is a perspective view of an adapter of the prior arts.
Figure 2:
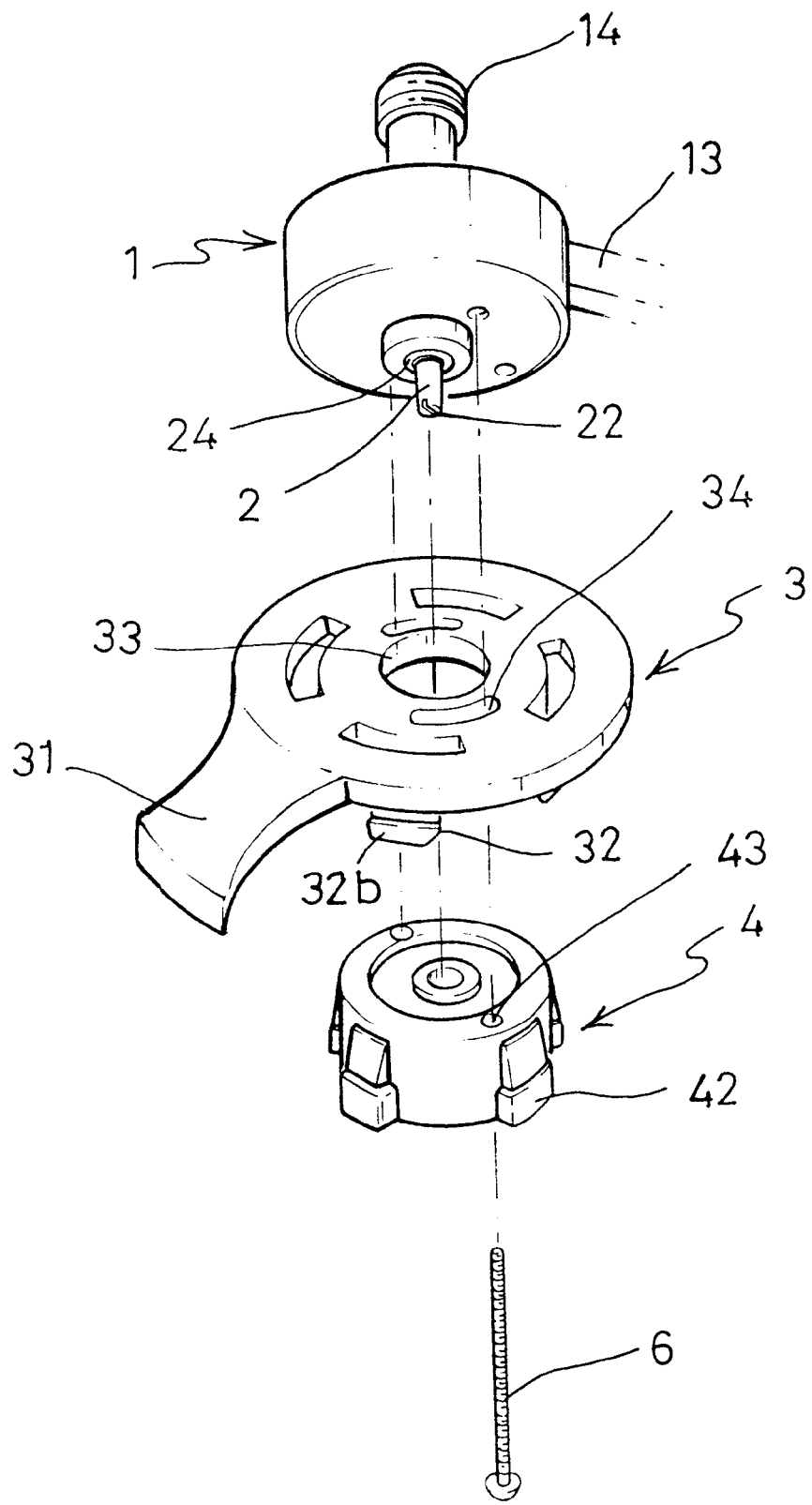
FIG. 2 is a exploded perspective view of an adapter according to a preferred embodiment of the present invention.
Figure 3:
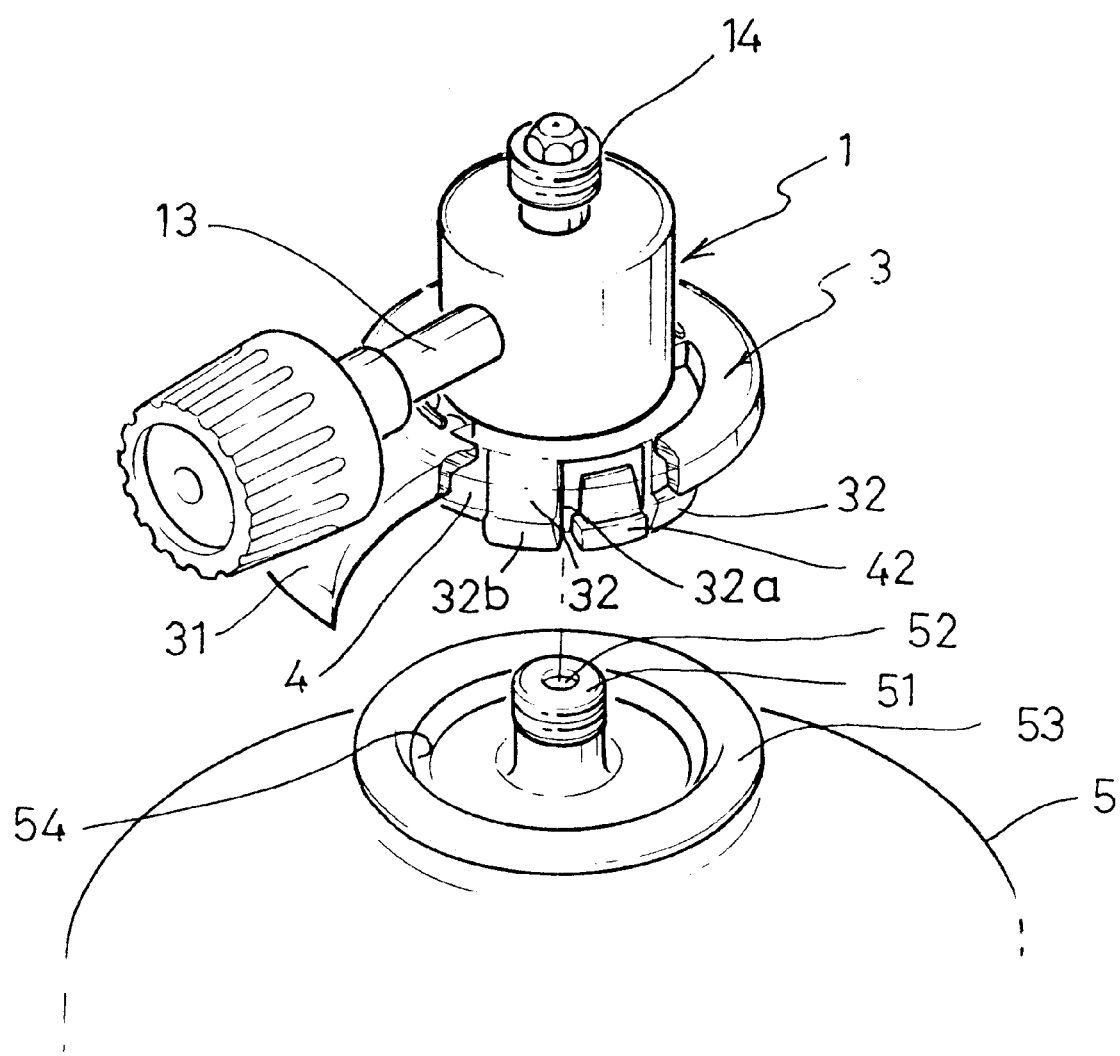
FIG. 3 is a partially cutaway view in perspective showing a state that the adapter is connected to a butane gas container.

Referring now to the drawings, wherein like reference characters designate corresponding parts throughout several views, the reference numeral 5 indicates a high pressure butane gas container.

The high pressure butane gas container 5 includes a gas outlet 51 for spouting gas, a nozzle hole 52 formed on the gas outlet 51, a support ring 53 protruded around the gas outlet 51 for holding an adapter, a rim 54 formed inside the support ring 53, a nozzle 55 arranged in the nozzle hole 52, and a O-shaped ring 56 for sealing a space between the nozzle 55 and the gas outlet 51.

Referring to the drawings, an adapter for the butane gas container according to the present invention includes: a connecting body 1 of cylindrical shape having a first opening 11 formed at a lower surface thereof, a gas delivery passage 12 extending from the opening 11, a gas volume controller 13 arranged at a center portion of the gas delivery passage 12, and a nozzle body 14 formed at a top portion of the gas delivery passage 12 and on an upper surface of the connecting body 1; a pressing member 2 for pressing the nozzle 55 arranged on the gas outlet 51 of the high pressure butane gas container 5, the pressing member 2 having a gas flow hole 21 formed through the pressing member 2, a groove 22 for leading gas discharged through the gas outlet 51 of the high pressure butane gas container 5 into the gas flow hole 21, a ring-shaped protrusion 23 protruded from a center portion of the pressing member 2, and a first O-shaped ring 24 to be sealably disposed between the ring-shaped protrusion 23 of the pressing member 2 and the first opening 11 of the connecting body 1; a supporting plate 3 rotatably arranged at the lower surface of the connecting body 1, the supporting plate 3 having a handle 31 protruded from one portion thereof, a plurality of elastic sections 32 protruded downwardly from the supporting plate 3, each of the elastic sections 32 having a stopper 32a protruded from either side thereof and a claw 32b to be caught in the rim 54 of the high pressure butane gas container 5, a second opening 33 formed at a center of the supporting plate 3 for inserting the portion that the first O-shaped ring is arranged between the pressing member 2 and the connecting body 1, and two arc-shaped holes 34 formed near the second opening 33 of the supporting plate 3; and a cam 4 arranged inside the elastic sections 32 and fixed to the connecting body 1 by bolts 6, the cam 4 having a third opening 41 for holding the gas outlet 51 of the high pressure butane gas container 5, a second O-shaped ring 44 for firmly sealing a space between the cam 4 and the gas outlet 51 of the high pressure butane gas container 5, a plurality of protrusions 42 protruded from an outer circumference of the cam 4, and two holes 43 for inserting the bolts.

The pressing member 2 has a lower end portion which is tapered to narrow gradually toward the end portion. The tapered end portion of the pressing member 2 can prevent damage of the O-shaped ring 56 in the high pressure butane gas container 5, when being inserted in the nozzle hole 52 formed on the gas outlet 51 of the high pressure butane gas container 5 so as to press the nozzle 55 in the nozzle hole 52.

When the supporting plate 3 is rotated, the elastic sections 32 ascend up the protrusions 42 of the cam 4 while spreading outwardly. When the protrusions 42 are contacted to the stopper 32a of the elastic sections 32, the supporting plate 3 stops the rotation.

The connecting body with the pressing member, the supporting plate, and the cam are united by the bolts.

The adapter for high pressure butane gas container 5 according to the present invention functions as follows.

The adapter having the previously described structure is connected with a dome-shaped high pressure butane gas container 5 which is usable in the high elevated areas, and then, the dome-shaped high pressure butane gas container 5 connected with the adapter is mounted in a portable gas stove. Because the nozzle body 14 mounted on the connecting body 1 has a screw thread on its outer circumference, it is screwed with an internal screw thread of the portable gas stove. Therefore, the high pressure butane gas container 5 can be connected to any portable gas stove through the medium of the adapter.

The conventional adapter is screwed with the screw thread formed on the gas outlet of the dome-shaped high pressure butane gas container 5. However, the adapter according to the present invention can be connected by following method: the elastic sections 32 of the connecting body 1 and the cam 4 are inserted in a space between the support ring 53 and the gas outlet 51, and then, either the handle 31 of the supporting plate 3 or the connecting body 1 is turned to one direction so as to connected to the dome-shaped high pressure butane gas container 5.

For further details, the process for connecting the adapter to the high pressure butane gas container 5 is described as follows.

Figure 4:
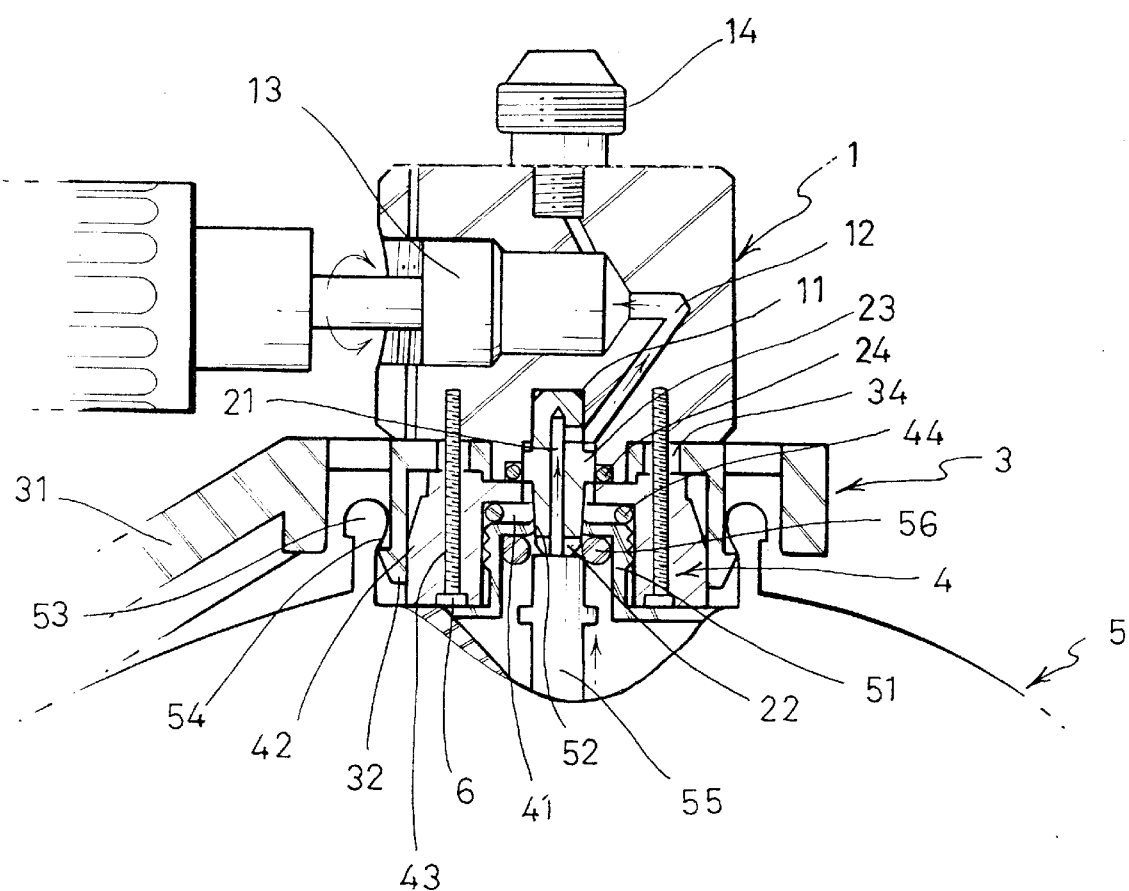
FIG. 4 is an expanded sectional view, partly in cross section, of FIG. 3.
Figure 5:
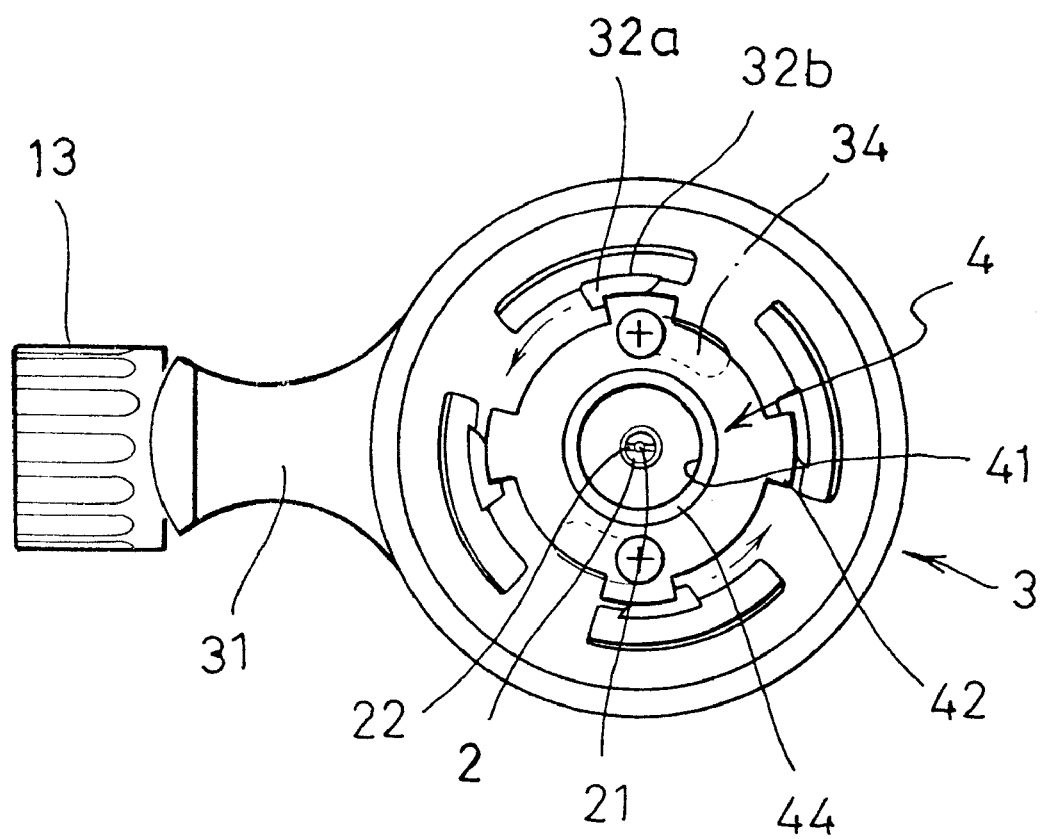
FIG. 5 is a bottom view of the adapter according to the preferred embodiment of the present invention.

The elastic sections 32 of the supporting plate 3 is positioned at spaces between the protrusions 42 of the cam 4, and the supporting plate 3 and the cam 4 which are united by the previously described above are inserted in the space between the support ring 53 and the gas outlet 51 of the high pressure butane gas container 5. When either the handle 31 of the supporting plate 3 or the connecting body 1 is rotated to one direction, pressing the upper portion of the connecting body 1, the supporting plate 3 or the connecting body 1 and the cam 4 is rotated within the range of a prescribed angle, i.e., the length of the arc-shaped holes 34 formed in the supporting plate 3. The elastic sections 32 protruded from the bottom surface of the supporting plate 3 are spread outwardly, stepping onto the pushing pins 42 of the cam 4. As shown in FIG. 4, the claws 32b of the elastic sections 32 are caught in the rim 54 of the support ring 53 of the high pressure butane gas container 5, so that the adapter is firmly connected to the high pressure butane gas container 5.

In order to separate the adapter from the high pressure butane gas container 5, either the supporting plate 3 or the connecting body 1 is rotated to the opposite direction against the previously described direction. Then, the elastic sections 32 are moved into the spaces between the protrusions 42 of the cam 4, and the elastic sections 32 are returned to their original condition by their restitutive force, so that the elastic sections 32 are removed from the rim 54 of the support ring 53.

Because the pressing member 2 inserted into the first opening 11 of the connecting body 1 has the gas flow hole 21 and the groove 22 formed at the end portion of the pressing member 2, when the upper portion of the connecting body 1 is pressed after the elastic sections 32 of the supporting plate 3 and the cam 4 are inserted the spaces between the support ring 53 and the gas outlet 51, the end portion of the pressing member 2 presses the nozzle 55 arranged in the gas outlet 51 of the high pressure butane gas container 5 to move the nozzle 55 downwardly.

The space between the nozzle 55 and the inner wall of the gas outlet 51 which is sealed by the O-shaped ring 56 is opened, so that the gas in the high pressure butane gas container 5 is discharged through the nozzle hole 52 of the gas outlet 51. The gas is flew into the gas delivery passage 12 of the connecting body 1 through the groove 22 and the gas flow hole 21 of the pressing member 2, since the second O-shaped ring 44 is disposed between the third opening 41 of the cam 4 and the upper portion of the gas outlet 51 of the high pressure butane gas container 5.

At this time, by controlling the gas volume controller 13 arranged at the gas delivery passage 12 of the connecting body 1, the volume of the gas discharged through the nozzle body 14 which is connected to the portable gas stove can be controlled.

In case that the pressing member 2 is inserted into the nozzle hole 52 of the high pressure butane gas container 5 and presses the nozzle 55 in the nozzle hole 52, the pressing member 2 is smoothly entered the gas inlet 51 without damaging the second O-shaped ring 56 positioned between the nozzle 55 and the gas outlet 51.

When either the handle 31 of the supporting plate 3 or the connecting body 1 is rotated, the stopper 32a of the elastic sections 32 prevents the elastic sections 32 from passing over the protrusions 42 of the cam 4.

Those skilled in the art will readily recognize that these and various other modifications and changes may be made to the present invention without strictly following the exemplary application illustrated and described herein and without departing from the true spirit and scope of the present invention, which is set forth in the following claims.

What is claimed is:

1. An adapter for a dome-shaped high pressure butane gas container, the adapter comprising:

a connecting body of cylindrical shape having a first opening formed at a lower surface thereof, a gas delivery passage extending from the opening, a gas volume controller arranged at a center portion of the gas delivery passage, and a nozzle body formed at a top portion of the gas delivery passage and on an upper surface of the connecting body;

a pressing member for pressing a nozzle arranged in a gas outlet of the dome-shaped high pressure butane gas container, the pressing member having a gas flow hole formed through the pressing member, a groove for leading gas discharged through the gas outlet of the high pressure butane gas container into the gas flow hole, a ring-shaped protrusion protruded from a center portion of the pressing member, and a first O-shaped ring to be sealably disposed between the ring-shaped protrusion of the pressing member and the first opening of the connecting body;

a supporting plate rotatably arranged at the lower surface of the connecting body, the supporting plate having a handle protruded from one portion thereof, a plurality of elastic sections protruded downwardly from the supporting plate, each of the elastic sections having a stopper protruded from either side thereof and a claw formed at an end portion of the elastic section to be caught in the rim of the high pressure butane gas container, a second opening formed at a center of the supporting plate for inserting the portion that the first O-shaped ring is arranged between the pressing member and the connecting body, and two arc-shaped holes formed near the second opening of the supporting plate; and a cam to be arranged inside the elastic sections and fixed to the connecting body by bolts, the cam having a third opening for holding the gas outlet of the high pressure butane gas container, a second O-shaped ring for firmly sealing a space between the cam and the gas outlet of the high pressure butane gas container, a plurality of protrusions protruded from an outer circumference of the cam, and two holes for inserting the bolts, the connecting body with the pressing member, the supporting plate, and the cam being united by the bolts, wherein when either the supporting plate or the connecting body is rotated a direction, the elastic sections ascend up the protrusions of the cam while spreading outwardly and either the supporting plate or the connection body stops the rotation by contact of the stoppers of the supporting plate and the protrusions of the cam, so that the claws of the elastic sections are caught in the rim of the high pressure butane gas container, and when the supporting plate or the connecting body is rotated to the opposite direction against the above direction, the elastic sections are separated from the protrusions of the cam and returned to their original condition by their restitutive force.

* * * * *